United States Patent Office 2,893,763
Patented July 7, 1959

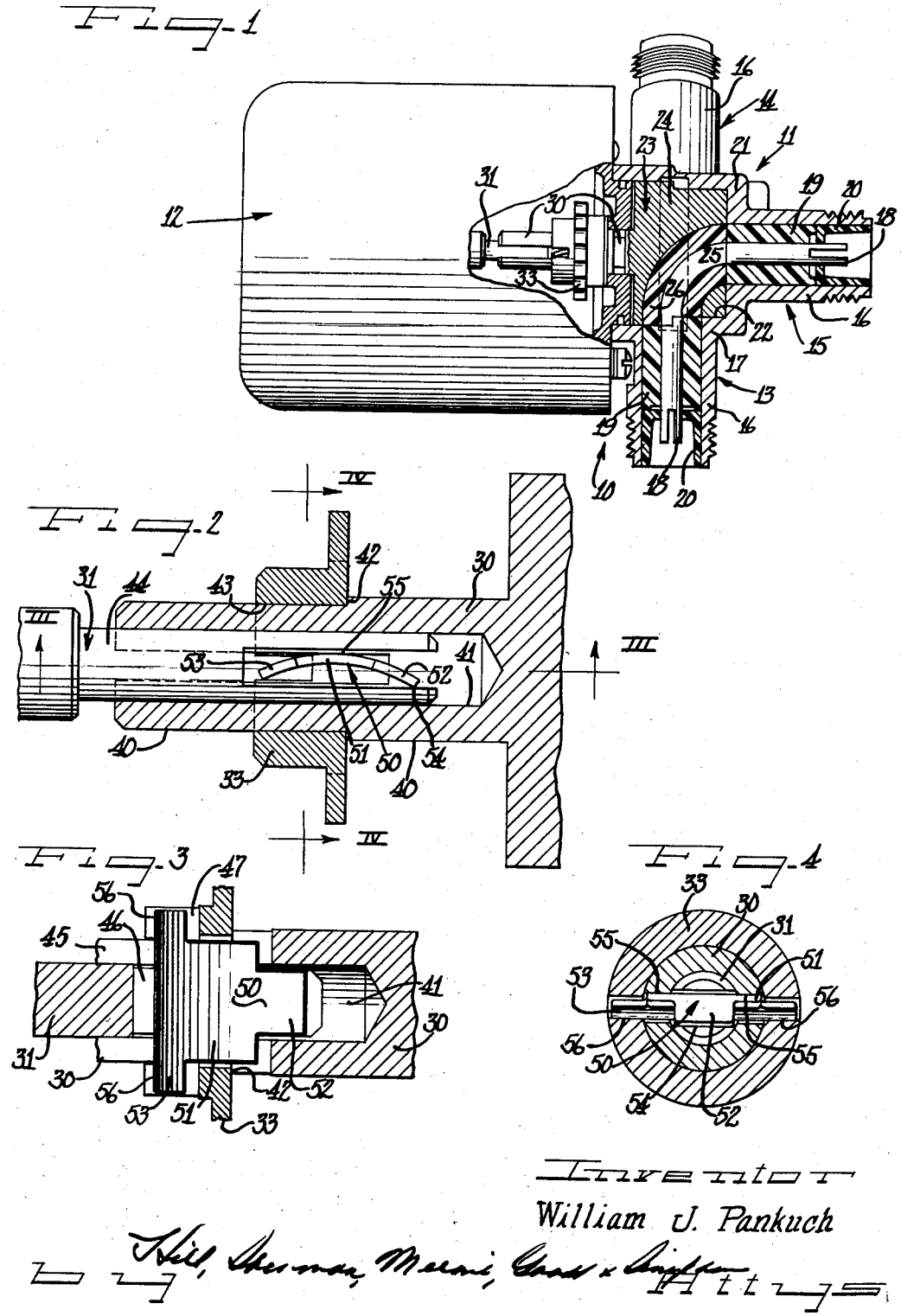

2,893,763
SHAFT KEYING MEANS

William J. Pankuch, Cleveland, Ohio, assignor to Thompson Ramo Wooldridge Inc., a corporation of Ohio Application July 16, 1953, Serial No. 368,462

18 Claims. (Cl. 287—52.05)

The present invention relates to shaft keying means and more particularly, the present invention relates to a system for resiliently keying a plurality of corotatable members.

Keying systems effected in accordance with the principles of the present invention advantageously provide resilient keying of a plurality of corotatable members. More importantly, keying systems constructed in accordance with the principles of the present invention are provided with resilient keying of concentric corotational members such as concentric shafts and/or gears and the like.

In many instances one or more of a group of concentric corotatable members such as shafts and/or gears may be subjected to a shock load which when transmitted to the other of the concentric members results in undesirable effects. Concentric shaft keying systems heretofore known were usually solid securing keying systems which transmitted such shock loads from one member to another or to all of the others. Resilient keying in accordance with the principles of the present invention obviates this difficulty and permits one of the members to be subjected to a shock torsional load without transmittal of that shock to the other members.

Another difficulty which existed in heretofore known concentric shaft and/or gear keying systems was that these gears or shafts were so rigidly affixed together that excessive forces were usually required to separate the members. Likewise, great force was necessary in assembling the members. Resilient shaft keying in accordance with the principles of the present invention permits assembly and disassembly of concentric shafts and/or gears by a very simple and easy axial push or pull respectively.

Further, in accordance with the principles of the present invention, the shaft keying system may be controlled to eliminate rotational lash between the concentric members below any desired torque limit and control the torsional resilience between the members above the desired torque limit. Along this same line, the torsional limit may be controlled to present one torque limit between certain of the concentric members and another torque limit between other of the concentric members, in pairs or in groups as desired.

It is, therefore, an important object of the present invention to provide a resilient shaft keying system for resiliently keying a plurality of concentric shaft and/or gear members or the like constructed for easy assembly and disassembly and capable of eliminating the transmission of torsional shock loads applied to one of the members in addition to eliminating rotational lash between the members and controlling the torsional resilience between the members above a preselected torque limit.

Another important object of the present invention is to provide a resilient keying system for concentric members including shafts and/or gears wherein the several concentric members are slotted each with a different width slot and a resilient key member so interfits with the slots as to have line contact with each of the concentric members thereby resiliently keying the same together.

It is still another object of the present invention to provide a shaft keying system for resiliently keying concentric members such as the rotational drive shaft, the rotor shaft and the detent stop gear of a coaxial switch or the like.

Still another object of the present invention is to provide a resilient keying system for a plurality of concentric members arranged for resilient corotation.

Still another object of the present invention is to provide a resilient keying system for a plurality of concentric corotatable members wherein rotational lash is eliminated below a pre-selected torque limit and control torsional resilience is provided to the members above the limit.

Still another object of the present invention is to provide a resilient keying system for a plurality of concentrically arranged corotatable members wherein the members are permitted easy and simple assembly and disassembly by an axial push or pull respectively therebetween.

Another important object of the present invention is to provide a resilient keying member for a plurality of concentric corotatable members, the resilient keying member being constructed to have line contact between the several corotatable members.

Still another object of the present invention is to provide a resilient shaft keying member for a plurality of corotatable shafts and/or gears, the resilient keying member having an arch pine tree configuration in accordance with the principles of the present invention.

Yet another object of the present invention is to provide a keying member of controlled torsional limits.

Still other objects, features and advantages of the present invention will become apparent from the following detailed description of the present invention and a preferred embodiment thereof, from the appended claims, and from the accompanying figures of drawings which form a part of this specification and fully disclose each and every detail shown thereon, in which like reference numerals refer to like parts, and in which:

Figure 1 is an elevational view, partially in section, of a coaxial switch and rotor drive therefor advantageously employing a resilient shaft keying system in accordance with the principles of the present invention;

Figure 2 illustrates, in section, a preferred form of resiliently keying the three corotatable members of the coaxial switch system of Figure 1 and constitutes one preferred embodiment of the present invention;

Figure 3 is a plan sectional view of the embodiment of Figure 2 taken along the line III—III thereof; and Figure 4 is an end sectional view taken along the line IV—IV of Figure 2.

There is illustrated in Figure 1 a coaxial switch assembly, indicated generally at 10, including a coaxial switch mechanism 11 and a rotor drive system 12 therefor. The coaxial switch 11 has a number of radially extending coaxial line connectors of which two are shown at 13 and 14, and an end conductor connector 15 which extends axially from the switch. Each of these connectors has an outer conductor 16 which is an appropriately configurated section of a switch housing 17 formed of a conductive material which is preferably highly conductive. In addition, each of the outer conductors 16 is preferably substantially tubular and contains therein an inner conductor 18 coaxially positioned therein by a dielectric insulator 19 of pre-selected dielectric qualities and a thrust absorbing positioning insert 20 also of preselected dielectric qualities.

The hub 21 of the coaxial switch 11 is formed with a substantially cylindrical cavity 22 therein housing a switch rotor assembly 23. The coaxial switch rotor assembly 23, in the construction shown, includes an electrically conductive switch rotor block 24 rotatably fitted into the cavity 22 and carrying a center conductor elbow member 25 and an elbow dielectric insulator 26 of preselected properties. The center conductor elbow 25 is so positioned within the rotor block 24 and is so configurated that one end thereof is conductively coupled to and end of the center conductor in the end conductor connector 15 and so that the other end thereof may be conductively coupled to one end of the center conductor of one of the radial connectors of which two, 13 and 14, are shown. The dielectric insulators 19 and 26 are so selected in their dielectric properties and dimensions as to present as close as possible an impedance match through the switch.

The coaxial switch mechanism 11 is operative to interconnect the end conductor connector 15 with any one of the radial connectors selectively as desired by rotation of the rotor assembly 23 within the housing hub 21.

One preferred system for rotating the rotor assembly 23 about its axis, which axis is also the axis of the end conductor connector 15, is to provide the same with a controlled rotator mechanism 12 which may include such a power mechanism as a rotary type solenoid or the like which is operable to effect controlled indexed rotation. To couple the rotor assembly 23 with the rotary power mechanism indicated generally at 12, however, the rotor block 24 includes a shaft 30 which is concentrically coupled with an output shaft 31 of the rotary power mechanism. These shafts 30 and 31 are so coupled together that rotary power and torque is transmitted from the drive shaft 31 through the rotor shaft 30 to the rotor assembly 23.

In systems such as this it has been found highly desirable and occasionally necessary to also provide the rotor assembly 23 with an appropriate stop mechanism which indicates proper coupling of the center conductor 25 with the center conductor with a desired pre-selected one of the radially extending connectors. A preferred form of stop mechanism includes a detent stop gear 33 coaxially arranged on the rotor shaft 30 for corotation therewith. The remainder of the stop mechanism and drive mechanism is not critical to the present invention and therefore has not been illustrated. It will be observed that it is not critical to the present invention that the rotary power system be a rotary type solenoid or the like but may even be a manual power system for effecting rotation of the rotor assembly 3 and the elbow members therein.

Since coaxial switches, like many other systems and mechanisms are somewhat delicate, at least in their tolerances, shock loads presented to the same, rotatably or axially, frequently result in damage to the system. It is therefore important that the coaxial switch and rotor assembly, like many other systems have its corotatable members resiliently coupled together to withstand torsional shock loads and/or axial shock loads. In addition to numerous other advantages the shaft and gear coupling systems embodying the principles of the present invention provide coaxial switch assemblies such as that described above and other systems wherein there is present a plurality of concentric members arranged for corotation, with resilient keying, shock load prevention, and elimination of rotational lash.

Figures 2, 3 and 4 illustrate a shaft and/or gear keying system embodying the principles of the present invention and particularly adapted to join the shafts 30 and 31 and the detent stop gear 33 so that axial and/or rotational shock loads presented to one of these members is not transmitted through the keying system to the other of the members. As stated, it will be readily understood, of course, that the system of the present invention is not limited to keying of but three corotatable members nor is it limited to application in a coaxial switch, but is a resilient keying system of general application for resiliently keying a plurality of concentric members arranged for resilient corotation etc.

As the principles of the present invention are applied to the shaft and gear arrangement of Figure 1 the shaft 30 is a male-female member formed as by machining or the like so that it is provided with a substantially cylindrical outer surface 40 and a substantially cylindrical coaxial recess 41. The outer cylindrical surface 40 of the shaft 30 may be of uniform diameter or it may be stepped as at 42 to provide a seating shoulder for the detent stop gear 33. The detent stop gear 33 is a female-like member slidably fitted over the outer surface 40 of the shaft 30 and has a coaxial bore or the like 43 therethrough of substantially the same diameter as the diameter of the outer cylindrical surface 40 of the shaft 30.

The shaft 31 is a male-like member having a preferably substantially cylindrical surface 44 slidably fitting into the recess 41 in the shaft 30 and having substantially the same diameter as the coaxial recess 41 in the shaft 30. Although the respective diameters of the several parts of the several members have been described as certain ones of them being substantially equal to certain others of them it will be understood of course that the several members are preferably easily slidably arranged and that although they may be machined to relatively close tolerances, close tolerances are in no way necessary to the system of the present invention and in many instances it may even be preferred to have a relatively loose fit between the several members for resilient keying in accordance with the principles of the present invention.

Each of the members 30, 31 and 33 are slotted as at 45, 46 and 47 respectively from the outer end of each thereof and the members are so angularly arranged that the slots 45, 46 and 47 are superimposed, that is, so that the slots 45, 46 and 47 lie in a substantially common plane. The embodiment of the present invention illustrated in Figures 2, 3 and 4 has the slot 46 in the shaft 31 of a greater width than the slot in the male-female shaft 30 and the slot 47 in the member 33 of a lesser width than the width of the slot 45 in the male-female shaft 30. Further, each of the slots 45, 46 and 47 are preferably so positioned and so provided in the members 30, 31 and 33 respectively that their widths are bisected by a plane or planes through the center or axis of the several members respectively. That is, the slots 45, 46 and 47 although of differing widths are each respectively one-half on each side of the center or axis plane of the several members.

Assembled in this preferred arrangement, the several corotatable members 30, 31 and 33 are arranged with the slots 45, 46 and 47 substantially superimposed and with their centers lying in a common plane. An arch pine tree spring viewed in side view in Figure 2, in plan view in Figure 3 and in end view in Figure 4, resiliently keys these corotatable members together. The arch pine tree spring is indicated generally by the numeral 50.

In this preferred embodiment of the present invention, the arch pine tree spring 50 is preferably formed as a simple stamped spring which may be controllably varied from spring to spring depending upon the desired use therefor and the desired torque limit thereof, in thickness, length, degree of arch, stepped widths, and in other physical properties thereof. As shown, the arched pine tree keying member or spring 50 is preferably of resilient metal stamped construction arched as illustrated in Figure 2 and stepped as hereinafter described to engage the several corotatable members each in line contact therewith.

The arched pine tree spring member 50 is formed with an intermediate section of a pre-selected width as at 51 about the same as or slightly less than the width of the male-female member 30. At one end thereof 52 the spring is narrower in width and has a width about the same as or slightly less than the width of the male member 31 and at the other end 53 thereof the keying member 50 has a width greater than the width of the section 51 and about the same as or slightly less than the width or diameter of the female rotatable member 33.

When included in the assembly of the corotatable members with superimposed slots 45, 46 and 47 the arch pine tree spring keying member 50 contacts the male member 31 in a single line contact 54 at the leading edge of the narrow section 52 thereof, contacts the male-female member 30 in a single line contact 55 laterally across the surface of intermediate width 51 and broken by the recess 41 in the male-female member 30, and contacts the outer female member 33 in a single line contact 56 across the edge of the wider section 53 thereof and broken by the opening 43 through the detent stop gear 33.

Now, from the above, it will be understood that in the assembly described forming a preferred embodiment of the present invention the spring-like pine tree configurated keying member 50 so keyingly couples the three concentric rotatable members 30, 31 and 33 that there is no lash therebetween and further that rotational shock loads impressed upon any one of the members will not be transmitted to the others through the keying system. The accomplishment of elimination of rotational lash is effected below a preselected desired torque limit for the spring member or keying member 50 and this torque limit may be controlled by controlling the thickness, length and degree of arch and other physical characteristics of the spring member. In addition, although it is preferred that the spring or keying member 50 have a uniform thickness for uniformly keyingly coupling the several members, different torque limits may be provided between one pair of the same and between another pair of the same by varying the thickness of the keying member 50 from one end thereof to the other.

Shock loads are not transmitted from one member to the other since the several members are slidably arranged and the keying member 50 not only does not prevent this slidable arrangement but enhances the same and utilizes it for assisting in easy assembly and disassembly of the several members. The members are assembled simply by positioning the shaft keying member within the slot 46 in the male member 31 and thereafter inserting the same into the coaxially arranged male-female member 30 and female member 33 having superimposed slots. Insertion in this manner for coupling of these corotatable members accomplishes positioning of the several members as they are viewed in enlargement in Figures 2, 3 and 4.

It will be understood of course that it is not critical that the center member have the intermediate width slot and that the outer member have the narrower slot and the inner member the wider slot but that they may be selected as desired and the keying member configurated as desired. The term arch pine three spring or keying member has been employed here as a generic description of the keying member 50 and is so used throughout this specification and claims but it will be understood that the spring member 50 may have its widest section in the center or its narrowest section in the center within the principles of the present invention so long as the keying member resiliently couples the several concentric corotatable members together with line contact with each and unbound or unlocked to any one of the corotatable members. In addition of course it is not essential that the several members have cylindrical surfaces but they may be flatted or squared or otherwise peripherally configurated as desired.

It will also be understood that numerous other modifications and variations may be effected without departing from the true scope and spirit of the novel concepts of the present invention.

I claim as my invention:

1. A system for resiliently keying a plurality of concentric members arranged for resilient corotation comprising, a male-female rotatable member, a male rotatable member disposed within said male-female member for corotation therewith, a female member disposed about said male-female member for corotation therewith, an axially extending slot in each of said members, said slots being superimposed and of different widths in each of said members, and a resilient keying member having portions of different width seated in said superimposed slots and being bowed in the axial direction for engaging each of said members in line contact individually.

2. A system for resiliently keying a plurality of concentric members arranged for corotation comprising a superimposed axial slot in each of said plurality of concentric members, said slots being of different widths from each other, and a resilient keying member having portions of different widths seated in said superimposed slots and being bowed in the axial direction for engaging said members in line contact individually.

3. A system for resiliently keying a plurality of concentric members arranged for resilient corotation comprising, a male-female rotatable member, a male rotatable member disposed within said male-female member for corotation therewith, a female member disposed about said male-female member for corotation therewith, an axially extending slot in each of said members, said slots being superimposed and of different widths from each other, and a resilient keying member having portions of different widths seated in said superimposed slots and being bowed in the axial direction with said portions of different widths being displaced axially along said member for engaging each of said members in line contact individually, said slot in said female member being of lesser width than the slot in said male-female member and the slot in said male member being of greater width than the slot in said male-female member.

4. A system for resiliently keying a plurality of concentric members arranged for resilient corotation comprising, a male-female rotatable member, a male rotatable member disposed within said male-female member for corotation therewith, a female member disposed about said male-female member for corotation therewith, an axially extending slot in each of said members, said slots being superimposed and of different widths from each other, and a resilient keying member having portions of different widths seated in said superimposed slots and engaging each of said members in line contact individually, axially opposite ends of said keying member transversely engaging said male member and said female member respectively, and an arch surface of said keying member transversely engaging said male-female member.

5. A system for resiliently keying a plurality of concentric members arranged for corotation comprising a superimposed axial slot in each of said plurality of concentric members, said slots being of different widths from each other, and a resilient keying member having portions of different widths seated in said superimposed slots and being bowed in the axial direction for engaging said members in line contact individually, said keying member having a spring-like construction of varying widths along the axial length of said member and arranged such that each section of differing widths engages in line contact a different one of said concentrically arranged members for resilient rotation.

6. A system for resiliently keying a plurality of concentric members arranged for resilient corotation comprising, a male-female rotatable member, a male rotatable member disposed within said male-female member for corotation therewith, a female member disposed about said male-female member for corotation therewith, an axially extending slot in each of said members, said slots being superimposed and of different widths from each other, and a resilient keying member having portions of different widths seated in said superimposed slots and engaging each of said members in line contact individually, the greatest width portion of said keying member engaging said female member, the smallest width portion of said keying member engaging said male member, and the intermediate width portion of said keying member engaging said male-female member, said slot in said female member being of lesser width than the slot in said male-female member and the slot in said male member being of greater width than the slot in said male-female member.

7. A system for keying a plurality of concentric members arranged for corotation comprising a male-female rotatable member, a male rotatable member disposed within said male-female member for corotation therewith, a female member disposed about said male-female member for corotation therewith, an axially extending slot in each of said members, said slots being superimposed, and a single keying member having portions of different widths seated in said superimposed slots and engaging each of said members, the portion of greatest width engaging said female member, the portion of least width engaging said male member, and an intermediate width portion engaging said male-female member.

8. In combination, a first shaft of cylindrical configuration having an end portion providing a flat internal chordal surface, a second shaft having an end portion with a cylindrical internal recess slidably receiving said end portion of said first shaft, said end portion of said second shaft providing axially and radially extending coplanar spaced shoulders at diametrically opposite sides of said internal recess and extending radially outwardly beyond the respective sides of said recess, said shoulders facing oppositely to said chordal surface of said first shaft, and a plate-like resilient spring member extending axially along said chordal surface of said first shaft and having a straight end edge thereof at one axial end of said spring member having line contact with said chordal surface in the radial direction, said spring member having radially projecting portions extending radially into overlying relation to said shoulders of said second shaft, said spring member including said radially projecting portions being bowed about an axis extending generally radially and parallel to said chordal surface and said shoulders, and means engaging the other axial end of said spring member opposite to said one axial end thereof to normally retain said radially projecting portions in resilient tensioned line contact with said shoulders intermediate said axial ends of said spring member, whereby said first and second shafts will turn together below a predetermined torque limit without backlash and whereby above said torque limit relative rotation between said first and second shafts will be resiliently opposed by torsional deflection of said one axial end of said spring member relative to said radially projecting portions thereof.

9. In combination, a first shaft of cylindrical configuration having an end portion providing a flat internal chordal surface, a second shaft having an end portion with a cylindrical internal recess slidably receiving said end portion of said first shaft and having diametrically opposite slots bifurcating said end portion of said second shaft and providing slot edge faces lying in a common plane substantially parallel to said chordal surface at diametrically opposite sides of said recess and facing oppositely to said chordal surface of said first shaft, a plate-like resilient spring member extending axially along said chordal surface of said first shaft and having an axial end thereof engaging said chordal surface, said spring member having an intermediate axially extending portion between the axial ends thereof and of substantially greater width than said axial end thereof engaging said chordal surface, said intermediate portion being of width to extend into the diametrically opposite slots of said second shaft in overlying relation to said slot edge faces, and means placing said spring member under resilient tension to connect said first and second shaft members for joint rotation without backlash below a predetermined torque limit and to cause said spring member to absorb relative rotation between said first and second shafts as a torsional deflection between said axial end thereof and said intermediate portion.

10. In combination, a first shaft of cylindrical configuration having an end portion providing a flat internal chordal surface, a second shaft having an end portion with a cylindrical internal recess slidably receiving said end portion of said first shaft and having diametrically opposite slots bifurcating said end portion of said second shaft and providing slot edge faces lying in a common plane substantially parallel to said chordal surface at diametrically opposite sides of said recess and facing oppositely to said chordal surface of said first shaft, a plate-like resilient spring member extending axially along said chordal surface of said first shaft and having an axial end thereof engaging said chordal surface, said spring member having an intermediate axially extending portion between the axial ends thereof and of substantially greater width than said axial end thereof engaging said chordal surface, said intermediate portion being of width to extend into the diametrically opposite slots of said second shaft in overlying relation to said slot edge faces, and means placing said spring member under resilient tension to connect said first and second shaft members for joint rotation without backlash below a predetermined torque limit and to cause said spring member to absorb relative rotation between said first and second shafts as a torsional deflection between said axial end thereof and said intermediate portion, said means comprising a third member fitting over said second shaft and having diametrically opposite recesses providing shoulders in a common plane generally parallel to said chordal surface and facing in the same direction as said chordal surface, the opposite axial end portion of said spring member being of width to extend into said recesses in said third member and engaging said shoulders of said third member, and said spring member being bowed about an axis extending generally parallel to said chordal surface of said first shaft and generally radially with respect to said shafts.

11. In combination, a plurality of relatively telescoping members having interconnecting recesses, an axially extended spring member having a first axially extending length portion of width to fit entirely within the recess of an inner one of said members, and having a second axially extending length portion of substantially greater width than said first length portion to engage in the recess of a second one of said members, and means placing said spring member under resilient tension to connect said telescoping members for joint rotation without backlash below a predetermined torque limit and to cause said spring member to absorb relative rotation between said telescoping members as a torsional deflection between said first and second length portion, said spring member being bowed in the axial direction.

12. In combination, a plurality of relatively telescoping members having interconnecting recesses, an axially extended spring member having a first axially extending length portion of width to fit entirely within the recess of an inner one of said members, having a second axially extending length portion of substantially greater width than said first length portion to engage in the recess of a second one of said members, and having a third axially extending length portion of substantially greater width than said second length portion to extend into the recess of a third outer one of said members, said spring member being under resilient tension to connect said telescoping members for joint rotation without backlash below a predetermined torque limit and to absorb relative rotation between said telescoping members as a torsional deflection between the respective length portions thereof.

13. In combination, a plurality of relatively telescoping members having interconnecting recesses, an axially extended spring member having a first axially extending length portion of width to fit entirely within the recess of an inner one of said members, having a second axially extending length portion of substantially greater width than said first length portion to engage in the recess of a second one of said members, and having a third axially extending length portion of substantially greater width than said second length portion to extend into the recess of a third outer one of said members, said spring member being under resilient tension to connect said telescoping members for joint rotation without backlash below a predetermined torque limit and to absorb relative rotation between said telescoping members as a torsional deflection between the respective length portions thereof, said spring member being of plate-like configuration and being of arcuate configuration in the axial direction to offset one of said length portions transversely of the axial direction with respect to the other two length portions.

14. In combination, a plurality of relatively telescoping members having interconnecting recesses, an axially extended spring member having a first axially extending length portion of width to fit entirely within the recess of an inner one of said members, having a second axially extending length portion of substantially greater width than said first length portion to engage in the recess of a second one of said members, and having a third axially extending length portion of substantially greater width than said second length portion to extend into the recess of a third outer one of said members, said spring member being under resilient tension to connect said telescoping members for joint rotation without backlash below a predetermined torque limit and to absorb relative rotation between said telescoping members as a torsional deflection between the respective length portions thereof, said spring member being of arcuate configuration conforming to a segmental cylindrical surface having an axis generally radially disposed with respect to said telescoping members and with said first and third length portions of said spring member engaging said first and third members at one radial side of a longitudinal axis with respect to said telescoping members.

15. An article of manufacture for keying a plurality of relatively telescoping members having interconnecting recesses comprising an axially extended spring member having a first axially extending length portion of width to fit entirely within the recess of an inner one of said members, having a second axially extending length portion of substantially greater width than said first length portion to engage in the recess of a second one of said members, and having a third axially extending length portion of substantially greater width than said second length portion to extend into the recess of a third outer one of said members.

16. An article of manufacture for keying a plurality of relatively telescoping members having interconnecting recesses comprising an axially extended spring member having a first axially extending length portion of width to fit entirely within the recess of an inner one of said members, having a second axially extending length portion of substantially greater width than said first length portion to engage in the recess of a second one of said members, and having a third axially extending length portion of substantially greater width than said second length portion to extend into the recess of a third outer one of said members, said spring member being of plate-like configuration and being of arcuate configuration in the axial direction to offset one of said length portions transversely of the axial direction with respect to the other two length portions.

17. An article of manufacture for keying a plurality of relatively telescoping members having interconnecting recesses comprising an axially extended spring member having a first axially extending length portion of width to fit entirely within the recess of an inner one of said members, having a second axially extending length portion of substantially greater width than said first length portion to engage in the recess of a second one of said members, and having a third axially extending length portion of substantially greater width than said second length portion to extend into the recess of a third outer one of said members, said spring member being of arcuate configuration conforming to a segmental cylindrical surface having an axis generally radially disposed with respect to said telescoping members and with said first and third length portions of said spring member engaging said first and third members at one radial side of a longitudinal axis with respect to said telescoping members.

18. In combination with a first shaft of cylindrical configuration having an end portion providing a flat internal chordal surface having a key engaging generally radially extending portion substantially axially offset from said chordal surface key engaging portion, a second shaft having an end portion with a cylindrical internal recess slidably receiving said end portion of said first shaft and having diametrically opposite slots bifurcating said end portion of said second shaft and providing slot edge faces lying in a common plane substantially parallel to said chordal surface at diametrically opposite sides of said recess and facing oppositely to said chordal surface of said first shaft, each slot edge face having a key engaging generally radially extending portion, a plate-like resilient spring member extending axially along said chordal surface of said first shaft and having an axial end thereof engaging said chordal surface key engaging portion, said spring member having an intermediate axially extending portion between the axial ends thereof and of substantially greater width than said axial end thereof engaging said chordal surface, said intermediate portion being of width to extend into the diametrically opposite slots of said second shaft in overlying relation to said slot edge faces to engage said slot edge faces at said key engaging portions thereof, and means placing said spring member under resilient tension to connect said first and second shaft members for joint rotation without backlash below a predetermined torque limit and to cause said spring member to absorb relative rotation between said first and second shafts as a torsional deflection between said axial end thereof and said intermediate portion, said means comprising a third member fitting over said second shaft and having diametrically opposite recesses providing shoulders in a common plane generally parallel to said chordal surface and facing in the same direction as said chordal surface with key engaging portions thereof substantially axially offset from said key engaging portions of said lot edge faces, the opposite axial end portion of said spring member being of width to extend into said recesses in said third member and engaging the key engaging portions of said shoulders of said third member, and said spring member being bowed about an axis extending generally parallel to said chordal surface of said first shaft and generally radially with respect to said shafts.

References Cited in the file of this patent

UNITED STATES PATENTS

| | | |
|---|---|---|
| 825,428 | Spencer | July 10, 1906 |
| 1,155,582 | Kelly | Oct. 5, 1915 |
| 1,251,108 | Ross | Dec. 25, 1917 |
| 1,695,343 | Pierce | Dec. 18, 1928 |
| 1,832,554 | Holstein | Nov. 17, 1931 |
| 1,903,457 | Holstein | Apr. 11, 1933 |
| 2,170,352 | Schaefer | Aug. 22, 1939 |

FOREIGN PATENTS

| | | |
|---|---|---|
| 625,888 | Great Britain | July 6, 1949 |